(12) United States Patent
Fältman

(10) Patent No.: US 7,664,474 B2
(45) Date of Patent: Feb. 16, 2010

(54) PORTABLE ELECTRONIC DEVICE AND A METHOD IN A PORTABLE ELECTRONIC DEVICE

(75) Inventor: Irina Fältman, Lund (SE)

(73) Assignee: Sony Ericsson Mobile Communications AB, Lund (SE)

(*) Notice: Subject to any disclaimer, the term of this patent is extended or adjusted under 35 U.S.C. 154(b) by 561 days.

(21) Appl. No.: 11/532,209

(22) Filed: Sep. 15, 2006

(65) Prior Publication Data
US 2008/0070505 A1    Mar. 20, 2008

Related U.S. Application Data

(60) Provisional application No. 60/824,962, filed on Sep. 8, 2006.

(51) Int. Cl.
*H04B 1/18* (2006.01)
(52) U.S. Cl. .............. 455/152.1; 455/158.4; 455/569.2; 455/566; 455/41.2; 381/14; 381/79
(58) Field of Classification Search .............. 455/152.1, 455/158.4, 569.2, 566, 41.2, 3.06; 381/14, 381/79
See application file for complete search history.

(56) References Cited

U.S. PATENT DOCUMENTS

| | | | | |
|---|---|---|---|---|
| 4,493,099 A * | 1/1985 | Schmidt | ....................... | 381/14 |
| 4,712,250 A * | 12/1987 | Michels et al. | ................. | 455/20 |
| 5,319,716 A * | 6/1994 | McGreevy | .................... | 381/79 |
| 5,408,686 A * | 4/1995 | Mankovitz | ................. | 455/66.1 |
| 5,428,825 A * | 6/1995 | Tomohiro et al. | ......... | 455/186.1 |
| 5,842,119 A * | 11/1998 | Emerson et al. | .......... | 455/161.3 |
| 5,905,947 A * | 5/1999 | Stein | ......................... | 455/90.3 |
| 5,946,604 A * | 8/1999 | Bailey | .......................... | 455/42 |
| 5,970,390 A * | 10/1999 | Koga et al. | ..................... | 455/42 |
| 6,163,711 A * | 12/2000 | Juntunen et al. | ............. | 455/557 |
| 6,608,399 B2 * | 8/2003 | McConnell et al. | ......... | 307/10.1 |
| 6,782,239 B2 * | 8/2004 | Johnson et al. | ............... | 455/42 |
| 7,149,312 B1 * | 12/2006 | Wildhagen | ..................... | 381/2 |
| 7,340,249 B2 * | 3/2008 | Moran et al. | .............. | 455/426.1 |
| 2003/0236075 A1 * | 12/2003 | Johnson et al. | ................ | 455/99 |
| 2005/0148325 A1 * | 7/2005 | Kopra et al. | ................. | 455/420 |
| 2006/0282665 A1 * | 12/2006 | Zhu et al. | .................... | 713/160 |

FOREIGN PATENT DOCUMENTS

| | | |
|---|---|---|
| EP | 0920170 | 6/1999 |
| EP | 1047249 | 10/2000 |
| EP | 1370053 | 12/2003 |
| GB | 2344480 | 6/2000 |

* cited by examiner

*Primary Examiner*—Minh D Dao
(74) *Attorney, Agent, or Firm*—Harrity & Harrity, LLP

(57) ABSTRACT

A method in a portable communication device for displaying information includes encoding data and transmitting the encoded data to a display associated with a vehicle. The encoded data is received by a receiver associated with the display, decoded and displayed.

12 Claims, 2 Drawing Sheets

PORTABLE ELECTRONIC DEVICE AND A METHOD IN A PORTABLE ELECTRONIC DEVICE

RELATED APPLICATION

This application claims priority under 35 U.S.C. § 119 based on U.S. Provisional Application Ser. No. 60/824,962, filed Sep. 8, 2006, the disclosure of which is hereby incorporated herein by reference.

TECHNICAL FIELD

The present invention relates generally to a portable electronic device and a method in a portable electronic device. In particular, the invention relates to information data that is transferred to and displayed in an information presenting device.

BACKGROUND OF THE INVENTION

Portable electronic devices, such as mobile phones of today, include a display where text information, such as network and battery status information, short message service (SMS) messages, call information, etc., may be displayed. These portable electronic devices are often used while driving, e.g., by using hands free equipment. That is, the portable electronic device may be controlled without requiring the user to directly input information to the portable electronic device using his/her hands. However, even though the handling of the portable electronic device is made easier by means of hands free equipment, it is sometimes difficult to see the information/data in the mobile phone display while driving a car, depending on where the phone is placed and the size of the display and/or size of the displayed text.

SUMMARY OF THE INVENTION

Aspects of the invention provide a mechanism for making it easier for a driver of a car to handle a portable electronic device while driving the car.

According to a first aspect, a method in a portable communication device for displaying information data in a display of an information presenting device in a vehicle is provided. The portable communication device comprises an FM transmitter and a Radio Data System (RDS) encoder. The information presenting device comprises a Frequency Modulation (FM) receiver and a RDS decoder. The method comprises the steps of: encoding the information data by means of the RDS encoder and transmitting the encoded information data, by means of the FM transmitter, to the information data presenting device. The information data is received by the FM receiver in the information presenting device, decoded by means of the RDS decoder in the information presenting device and displayed in the display of the information presenting device.

According to a second aspect of the invention, the portable communication device further comprises an application. The method comprises the further steps, to be taken before the steps of encoding the information data and sending the encoded information data to the information presenting device, of activating the application, which activating step triggers the further step of: transferring the information data to the RDS encoder.

According to a third aspect of the invention, the portable communication device is a mobile phone.

According to a fourth aspect of the invention, the information presenting device is car stereo.

According to a fifth aspect of the invention, a computer program product in a portable communication device for displaying information data in a display of an information presenting device in a vehicle, comprises computer program code for causing a processing means within a computer placed in the portable communication device to control an execution of the steps of the first aspect described above, when said code is loaded into the portable communication device.

According to a sixth aspect of the invention, a portable communication device is provided. The portable communication device comprises an RDS encoder adapted to encode information data, and an FM transmitter adapted to transmit the information data encoded by the RDS encoder to an information presenting device. The information data is adapted to be received by an FM receiver in the information data presenting device, and is adapted to be decoded by means of an RDS decoder in the information data presenting device and is further adapted to be displayed in a display of the information presenting device.

According to a seventh aspect of the invention, the portable communication device further comprises an application, which application when activated is adapted to transfer the information data to the RDS encoder.

According to an eighth aspect of the invention, the FM transmitter is a circuit, built-in in the portable communication device or a stand-alone device being adapted to be connected to the portable communication device.

According to a ninth aspect of the invention, the portable communication device is a mobile phone.

According to a tenth aspect of the invention, the information presenting device is car stereo.

According to an eleventh aspect, a portable communication device comprises a display configured to display information, an encoder configured to encode the displayed information, and a transmitter configured to transmit the encoded information to a vehicle radio or stereo system for display by the vehicle radio or stereo system.

Since the information data is encoded by means of the RDS encoder and transmitted by means of the FM transmitter to the information data presenting device, the information data can be displayed in the display of the information presenting device in the car, which makes the information data visible for a driver of a car, and thus make it easier to handle the portable electronic device while driving the car.

An advantage of aspects described herein is that for a mobile phone equipped with an FM transmitter with RDS functionality, no extra hardware will be needed to be able to display phone related information on a car radio/stereo display. Another advantage of aspects described herein is that no extra hardware is needed for the car stereo to allow the car stereo to display the phone related information.

DETAILED DESCRIPTION OF PREFERRED EMBODIMENTS

Aspects of the invention are described below as including a method and a device which may be put into practice in the embodiments described below.

Figure 1:
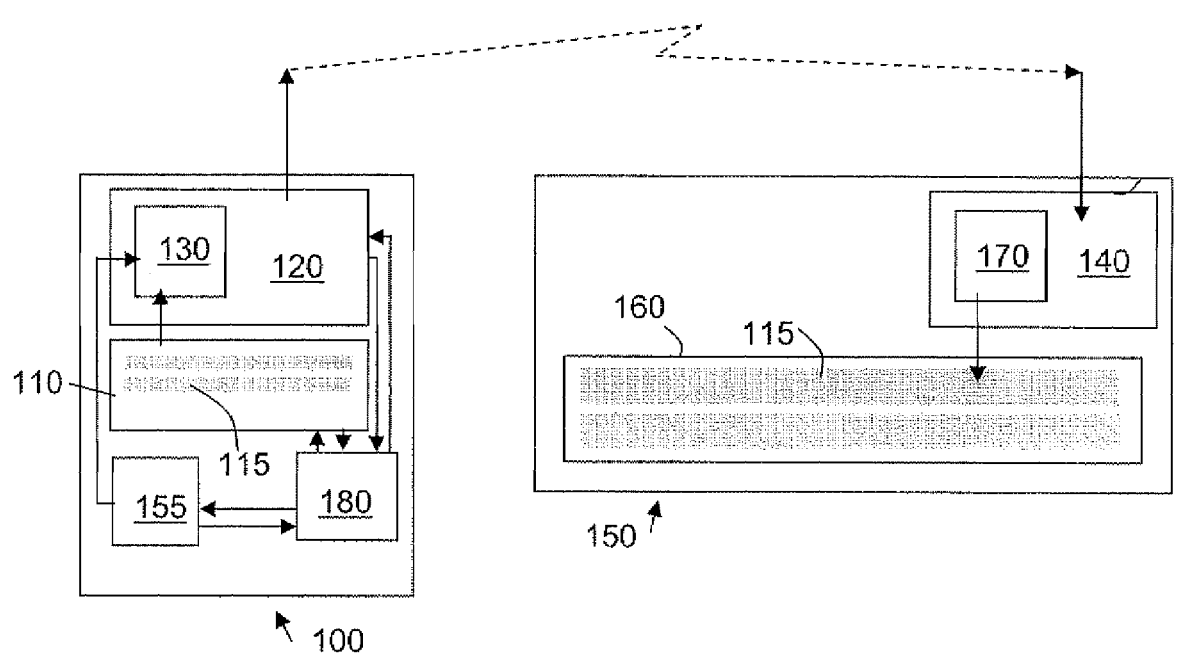
FIG. 1 is a schematic block diagram illustrating an exemplary portable communication device communicating with an information presenting device.

FIG. 1 illustrates a portable communication device 100. The portable communication device 100 may be a mobile phone, a Personal Digital Assistant (PDA) or any portable communication device. The portable communication device 100 includes a display 110 intended for displaying information data 115 associated with the portable communication device 100. For example, information data 115 may include text, such as caller information (e.g., telephone numbers, names, etc.), a Short Message Service (SMS) message, phone battery status or other text messages, phone profile information (e.g., normal, meeting, car, hands free, etc.), reminders (e.g., meeting in 15 minutes), e-mail, Bluetooth and IR status (if active), etc. An information presenting device such as a car stereo display is designed to be clearly visible for the driver. Therefore, aspects of the invention use a display in an information presenting device in a vehicle for displaying information data associated with a portable communication device so that the information data is easily visible to a driver.

In an exemplary implementation, the portable communication device 100 includes a Frequency Modulation (FM) transmitter 120 and a Radio Data System (RDS) encoder 130 for the transmission of the information data 115. An RDS system is a commonly used system for encoding small amounts of data, usually information data about the FM-radio station, the song being played and sometimes traffic information data. The small amounts of data are sent along with a conventional FM radio signal allowing devices that include RDS decoders to display information text, station names, etc. In an exemplary implementation, the RDS encoder 130 may be included in FM transmitter 120. Alternatively, the RDS encoder 130 may be located externally from FM transmitter 120.

In an exemplary implementation, the information data 115 in portable communication device 100 is adapted to be transferred to the RDS encoder 130, where the RDS encoder 130 is adapted to encode the information data 115. The FM transmitter 120 may be configured to send the encoded information data 115 to an FM receiver 140 in an information presenting device 150 in a vehicle by using FM signals. The FM transmitter 120 in the portable communication device 100 may transmit the information data 115 on a specific frequency. The FM transmitter 120 may be a circuit included within the portable communication device 100 or may be, for example, a stand-alone device that is adapted to be connected to the portable communication device 100.

The portable communication device 100 may further include an application 155, such as a software and/or hardware application. When the application 155 is activated by the user, the process of transferring the information data 115 to the RIDS encoder 130, encoding the information data 115 and sending the encoded information data 115 to the information presenting device 150 may be triggered to start.

The information presenting device 150 may be, for example, a car radio system or car stereo system in a vehicle. The FM receiver 140 in the information presenting device 150 is adapted to receive the information data 115 sent by the FM transmitter 120 in the portable communication device 100. The FM receiver 140 is adapted to receive the information data 115 on a specific channel. The specific channel may have the same specific frequency as the frequency via which the FM transmitter 120 in the portable communication device 100 is sending the information data 115. The information presenting device 150 may further include an RDS decoder 170 which may be included in the FM receiver 140. The RDS decoder 170 is adapted to decode the received information data 115, encoded by the RDS encoder 130. The information presenting device 150 may further include a display 160 that preferably is located or placed in an area clearly visible to a driver of the vehicle. The display 160 is adapted to display the information data 115 received by the FM receiver 140 and decoded by the RDS decoder 170.

To view information via information presenting device 150, the user of the portable communication device 100 may just have to start (e.g., turn on) the information presenting device 150 and if not already set, tune the FM receiver 140 in the information presenting device 150 to the specific channel (i.e., the channel used by FM transmitter 120), to make the information data 115 visible in the display 160 of the information presenting device 150. This specific frequency may be preset for a specific channel, e.g., channel 3, in the information presenting device 150 so that the user only has to click on channel 3 in the information presenting device 150 to make the information data 115 visible in the display 160. In this manner, the user of portable communication device 100 may use display 160 as an alternate display (i.e., other than display 110) for telephone related information while driving a vehicle.

In other implementations, FM transmitter 120 may be configured to encode and simultaneously broadcast the encoded data on a number of frequencies, such as a number of frequencies associated with stations frequently listened to by the user (e.g., radio stations associated with preset buttons on the car radio/stereo system). In this way, the information from display 110 may be viewed via display 160 when the car radio/stereo is tuned to any of these particular stations. In addition, in some implementations, the user of mobile communication device 100 may be able to select the particular input frequency or frequencies that FM transmitter 120 will use to transmit the information data via a selection mechanism on portable communication device 100.

Figure 2:
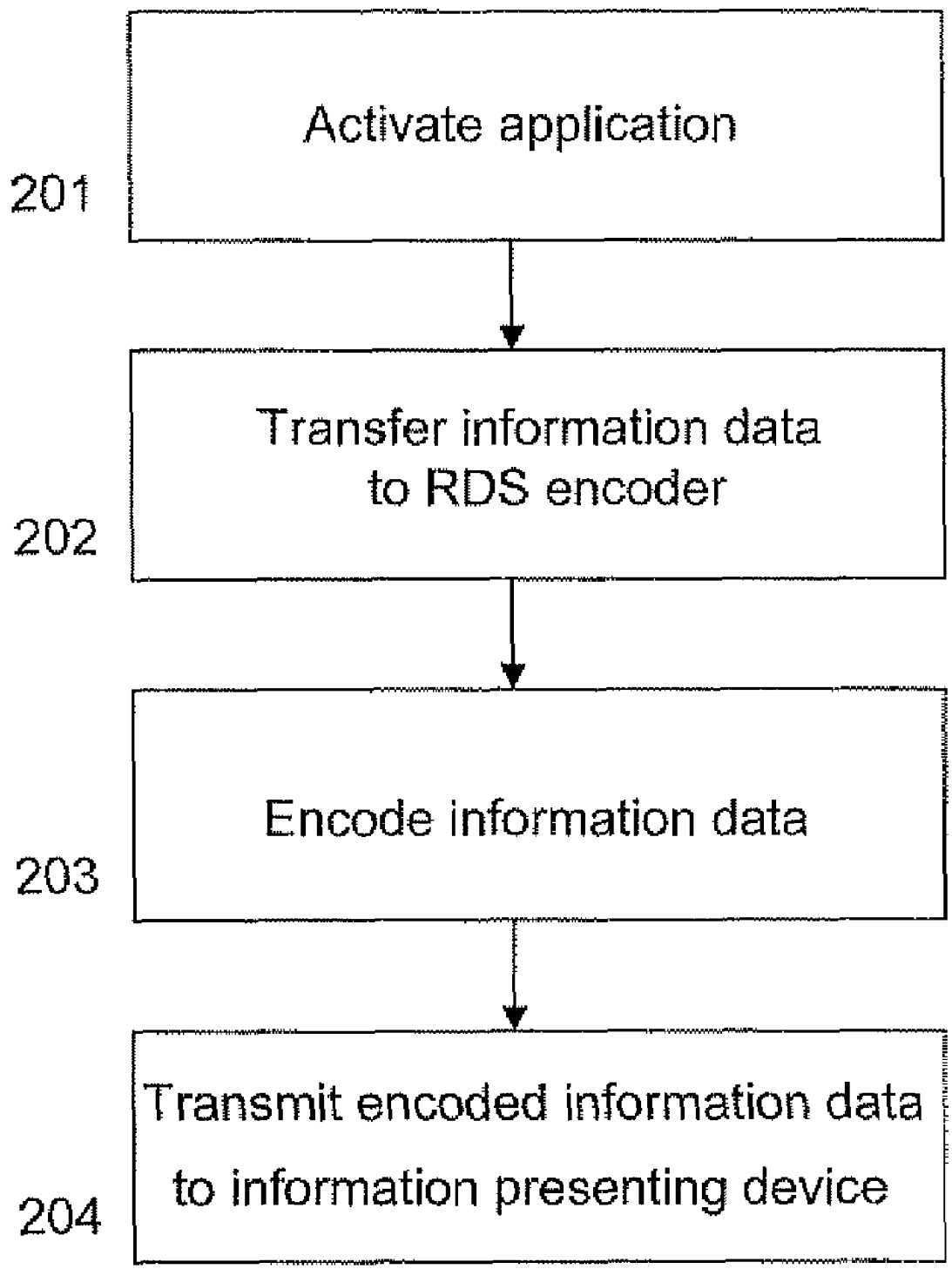
FIG. 2 is flowchart illustrating an exemplary method consistent with the present invention.

FIG. 2 depicts an exemplary method that may be performed by the portable communication device 100. Assume that the user of the portable communication device 100 is in a vehicle and wishes to make the information data 115 in the portable communication device 100 visible in the display 160 in the information presenting device 150. Further assume that the application 155 in the portable communication device 100 is activated by the user (201). The activation of application 155 may be done, for example, by pressing one or more buttons on portable communication device 100 associated with activating application 155, opening a menu listing a number of applications included in portable communication device 100 and selecting application 155, etc.

The information data 115 may then be transferred to the RDS encoder 130 (202). This may be triggered by the activated application 155. The RDS encoder 130 encodes the information data 115 (203).

The FM transmitter 120 may then transmit the encoded information data 115 to the FM receiver 140 in the information presenting device 150 (204). This may be triggered by the application 155, such as by activating/starting application 155. The RDS decoder 170 in the information presenting device 150 decodes the encoded information data 115 and the decoded information data 115 is made visible in the display 160 in the information presenting device 150. In this manner, information that is displayed on display 110 of portable communication device 100 may also be displayed (e.g., concurrently) on display 160 of information presenting device 150. Advantageously, this may allow the user of portable communication device 100 to more easily view information associated with the operation of portable communication device 100 while he/she is driving.

The present mechanism for displaying information data can be implemented through one or more processors or microprocessors, such as the processor 180 in the portable communication device 100 depicted in FIG. 1, together with computer program code for performing the functions described herein. The program code mentioned above may also be provided as a computer program product, for instance in the form of a data carrier carrying computer program code for performing the functions described herein when loaded into the first device. One such carrier may be in the form of a CD ROM disc. It is, however, feasible to user other data carriers or types of computer-readable mediums, such as a memory stick. The computer program code can furthermore be provided as pure program code on a server and downloaded to the first portable communication device 100 remotely or may be pre-stored in portable communication device 100.

As described above, aspects of the invention may be implemented in methods and/or computer program products. Accordingly, the invention may be embodied in hardware and/or in software (including firmware, resident software, micro-code, etc.). The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, microprocessor, an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The present invention is not limited to the above-describe preferred embodiments. Various alternatives, modifications and equivalents may be used. For example, the above described embodiments refer to an information presenting device in a vehicle that is part of a car radio/stereo system. In other implementations, the information presenting device may be associated with or may be part of other vehicle systems/devices, such as a display associated with a vehicle monitoring system.

Therefore, the above embodiments should not be taken as limiting the scope of the invention. The scope of the invention is defined by the claims and their equivalents.

The invention claimed is:

1. A method to display textual information, from a portable communication device, in a display of an information presenting device in a vehicle,
    the portable communication device comprising a frequency modulation (FM) transmitter and a radio data system (RDS) encoder,
    the information presenting device comprising a FM receiver, a RDS decoder, and a display, and
    the method comprising:
        displaying, on the portable communication device, the textual information;
        transferring, in response to receiving a user input, the displayed textual information to the RDS encoder;
        encoding the transferred information using the RDS encoder; and
        transmitting the encoded textual information, by the FM transmitter, to the vehicle, the transmitted textual information to be:
            received by the FM receiver in the information presenting device,
            decoded by the RDS decoder in the information presenting devices and
            displayed in the display of the information presenting device.

2. The method according to claim 1, where the portable communication device further comprises an application, and
    where the method further comprises activating the application, and
    where transferring the textual information to the RDS encoder is in response to activating the application, where activating the application and transferring the textual information occur prior to encoding the textual information and transmitting the encoded textual information.

3. The method according to claim 1, where the portable communication device comprises a mobile phone.

4. The method according to claim 1, where the information presenting device comprises one of a car radio or a car stereo.

5. A computer program product in a portable communication device to display textual data in a display of an information presenting device in a vehicle, the computer program product comprising computer program code for causing a processor in the portable communication device to perform, when said code is loaded into the portable communication device, a method comprising:
    displaying the textual data on the portable communication device
    transferring the displayed textual data to a radio data system (RDS) encoder associated with the portable communication device;
    encoding the transferred textual data using RDS encoder
    forwarding the encoded textual data to a frequency modulation (FM) transmitter associated with the portable communication device; and
    transmitting the encoded textual data, by the FM transmitter, to the vehicle, the textual data being:
        received by a FM receiver associated with the information presenting device,
        decoded by a RDS decoder associated with the information presenting devices, and
        displayed in the display of the information presenting device.

6. The computer program product according to claim 5, where the portable communication device comprises a mobile phone.

7. The computer program product according to claim 5, where the information presenting device comprises one of a car radio or a car stereo.

8. A portable communication device comprising:
- a display to display textual information;
- a radio data system (RDS) encoder to:
  - receive the displayed textual information in response to a user input, and encode the received textual information; and
- a FM transmitter to transmit the encoded textual information to an information presenting device, where the textual information is:
  - received by a frequency modulation (FM receiver in the information presenting device,
  - decoded by a RDS decoder in the information presenting device, and
  - displayed in a display of the information presenting device.

9. The portable communication device according to claim 8, further comprising:
- an application which when activated, is to transfer the displayed information to the RDS encoder.

10. The portable communication device according to claim 8, where the FM transmitter comprises at least one of:
- circuitry included in the portable communication devices or
- a stand-alone device connected to the portable communication device.

11. The portable communication device according to claim 8, where the portable communication device comprises a mobile phone.

12. The portable communication device according to claim 8, where the information presenting device comprises a car stereo.

* * * * *

UNITED STATES PATENT AND TRADEMARK OFFICE
CERTIFICATE OF CORRECTION

| | |
|---|---|
| PATENT NO. | : 7,664,474 B2 |
| APPLICATION NO. | : 11/532209 |
| DATED | : February 16, 2010 |
| INVENTOR(S) | : Fältman |

Page 1 of 1

It is certified that error appears in the above-identified patent and that said Letters Patent is hereby corrected as shown below:

Col. 6, line 23, delete the word "devices" and replace with "device,"
   Col. 6, line 49, after the word "device" insert --;--
   Col. 6, line 53, after the word "encoder" insert --;--
   Col. 8, line 7, delete the word "devices" and replace with "device,"

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,664,474 B2  Page 1 of 1
APPLICATION NO. : 11/532209
DATED : February 16, 2010
INVENTOR(S) : Faltman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 715 days.

Signed and Sealed this

Twenty-third Day of November, 2010

David J. Kappos
*Director of the United States Patent and Trademark Office*